United States Patent
Muthuswamy

(10) Patent No.: US 8,214,793 B1
(45) Date of Patent: Jul. 3, 2012

(54) AUTOMATIC RESTORATION OF TOOL CONFIGURATION WHILE NAVIGATING LAYERS OF A COMPOSITION

(75) Inventor: Pillai Subbiah Muthuswamy, Mumbai (IN)

(73) Assignee: Adobe Systems Incorporated, San Jose, CA (US)

( * ) Notice: Subject to any disclaimer, the term of this patent is extended or adjusted under 35 U.S.C. 154(b) by 1040 days.

(21) Appl. No.: 11/823,655

(22) Filed: Jun. 28, 2007

(51) Int. Cl.
  *G06F 9/44* (2006.01)
(52) U.S. Cl. ......... 717/104; 717/100; 717/105; 717/109
(58) Field of Classification Search .................. None
  See application file for complete search history.

(56) References Cited

U.S. PATENT DOCUMENTS

| | | | |
|---|---|---|---|
| 7,191,429 B2 * | 3/2007 | Brassard et al. | 717/104 |
| 7,900,186 B2 * | 3/2011 | Lucassen et al. | 717/104 |
| 7,945,897 B1 * | 5/2011 | Cook | 717/121 |
| 8,006,224 B2 * | 8/2011 | Bateman et al. | 717/104 |
| 8,086,995 B2 * | 12/2011 | Luo et al. | 717/105 |
| 2004/0117735 A1 * | 6/2004 | Breen | 715/517 |
| 2006/0015839 A1 * | 1/2006 | Owens et al. | 717/100 |
| 2007/0157159 A1 * | 7/2007 | Fildebrandt et al. | 717/104 |
| 2007/0260702 A1 * | 11/2007 | Richardson et al. | 709/217 |
| 2008/0288918 A1 * | 11/2008 | Knura et al. | 717/106 |
| 2008/0313594 A1 * | 12/2008 | Smith | 717/100 |
| 2010/0037206 A1 * | 2/2010 | Larimore et al. | 717/109 |

OTHER PUBLICATIONS

"Adobe Photoshop 7.0", published 2002, 549 pages, <tolweb.org/tree/ToL.documents/photoshop7_user.pdf>.*
Interactive Media Center, Univ. at Albany, Adobe Photoshop CS4 Basic Tips, Jun. 2011, 5 pages, <http://library.albany.edu/imc/pdf/photoshop_tips_tricks.pdf>.*
Academic Initiatives, Adobe Photoshop CS3, 2007, 10 pages, <http://www.housing.wisc.edu/docs/tlc_quicktip_photoshop.pdf>.*

* cited by examiner

*Primary Examiner* — Thuy Dao
(74) *Attorney, Agent, or Firm* — Van Pelt, Yi & James LLP

(57) ABSTRACT

A selection of a layer is received from a plurality of layers of a composition. A tool type and one or more tool setting(s) are obtained based at least in part on the selected layer, where in the event the selected layer was previously selected at least once, the obtained tool type and tool setting(s) were in use a last time the selected layer was selected. A tool is automatically configured using the obtained tool type and tool setting(s), where the tool is associated with manipulating the composition.

17 Claims, 8 Drawing Sheets

| | Current Configuration | | Configuration Prior to Current One | |
|---|---|---|---|---|
| Layer 3 (Top) | Text tool | Font = Times New Roman, Font Size = 12 point | None | N/A |
| Layer 2 | Paintbrush tool | Color = White, Paintbrush type = Puffy | Paintbrush tool | Color = White, Paintbrush type = Regular |
| Layer 1 (Bottom) | Gradient tool | Color = Blue, Gradient = 5 | Gradient tool | Color = Blue, Gradient = 0 |

| Layer 3 (Top) | Text tool | Font = Times New Roman, Font Size = 12 point |
|---|---|---|
| Layer 2 | Paintbrush tool | Color = White, Paintbrush type = Puffy |
| Layer 1 (Bottom) | Gradient tool | Color = Blue, Gradient = 5 |

|  | Current Configuration | | Configuration Prior to Current One |
|---|---|---|---|
| Layer 3 (Top) | Text tool | Font = Times New Roman, Font Size = 12 point | None | N/A |
| Layer 2 | Paintbrush tool | Color = White, Paintbrush type = Puffy | Paintbrush tool | Color = White, Paintbrush type = Regular |
| Layer 1 (Bottom) | Gradient tool | Color = Blue, Gradient = 5 | Gradient tool | Color = Blue, Gradient = 0 |

AUTOMATIC RESTORATION OF TOOL CONFIGURATION WHILE NAVIGATING LAYERS OF A COMPOSITION

BACKGROUND OF THE INVENTION

Software applications are used to edit and/or create a variety of compositions, such as still images or video. For example, an animator may use a software application to create an animated cartoon, or a graphic designer may use a software application to create a cover for a book. Often, a composition has multiple layers. For example, if the composition is a book cover the bottom layer may be cover art, the middle layer may be an author photograph for the back cover, and the top layer may be text for the front and back covers. In some cases, a composition has many layers and it is inconvenient or time consuming for users to work with such compositions using existing software applications. It would be desirable to develop more user friendly software applications for working with compositions that have layers.

BRIEF DESCRIPTION OF THE DRAWINGS

Various embodiments of the invention are disclosed in the following detailed description and the accompanying drawings.

FIG. 2 is a diagram illustrating an embodiment of a table used to store tool types and tool settings for layers of a composition.

FIG. 6 is a diagram illustrating an embodiment of a table configured to store the last two configurations for each layer in a composition.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
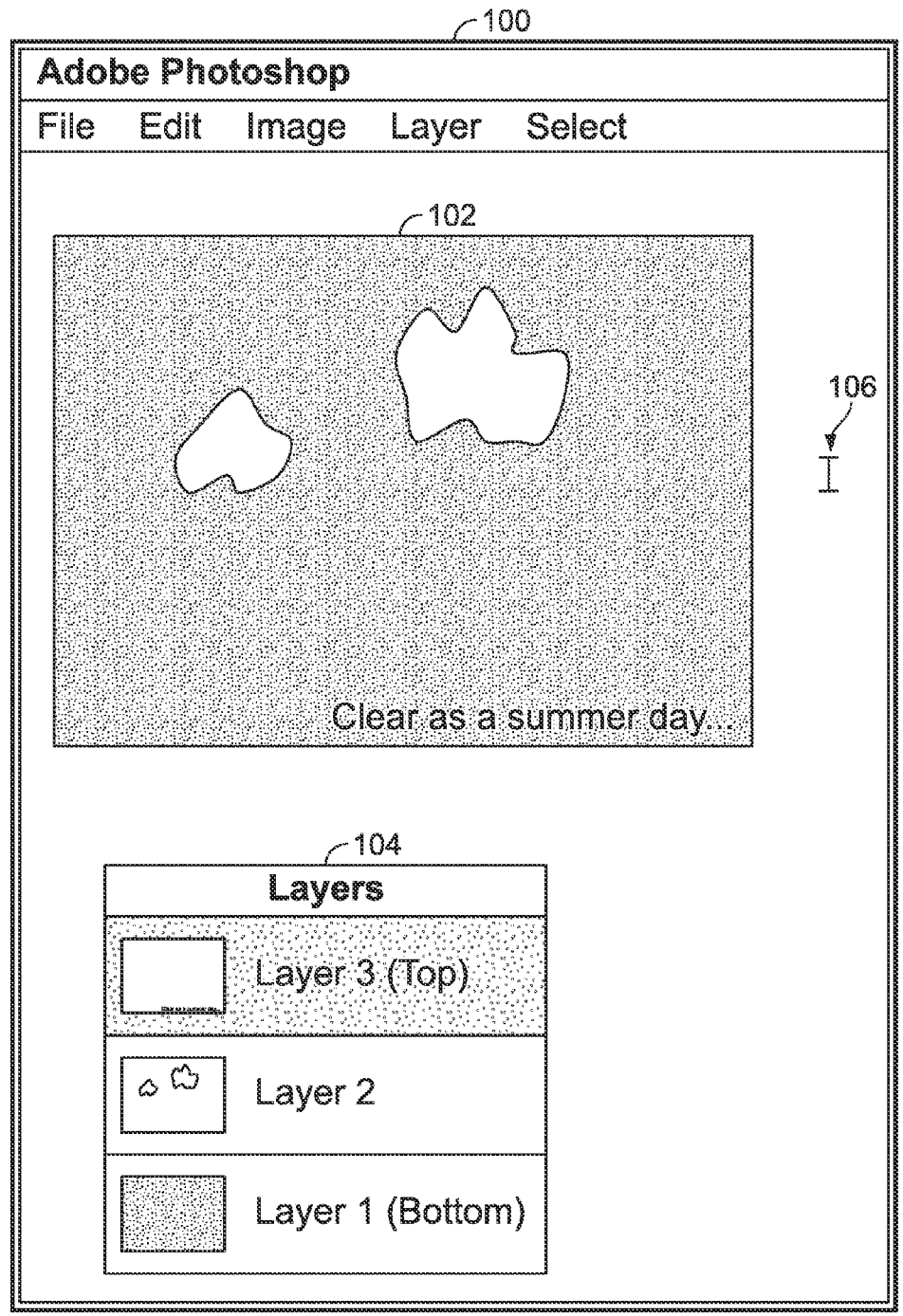
FIG. 1A is a diagram illustrating an embodiment of a software application configured to automatically restore the tool type and/or tool properties based on the layer of a composition.

FIG. 1A is a diagram illustrating an embodiment of a software application configured to automatically restore the tool type and/or tool properties based on the layer of a composition. In the example shown, software application 100 is an image editing application, Adobe® Photoshop®, that is configured to have this functionality. In general, a tool is used to manipulate data or an object in a particular layer and/or a composition as a whole. In some embodiments, tools are used to add, change, or delete content (e.g., text, objects, photographs, sound, etc.). In some embodiments, tools are used to control the layout or placement of an object. In some embodiments, tools are used to manipulate metadata. In some embodiments, a tool is used for extraction (e.g., copying or removing an object or data from a layer) or for a transformation (e.g., one type of format to another).

Composition 102 includes three layers. The top layer of composition 102 is layer 3 and includes text that says "Clear as a summer day . . . " The bottom layer is layer 1 and is a blue background with a gradient change (e.g., a gradual change from a darker shade of blue to a lighter shade of blue). Between layers 1 and 3 is layer 2, which includes two white clouds. In this example, composition 102 is a still image. In other embodiments, a composition is some other type of composition, such as a video.

Layers of a composition are positioned or ordered along a z-axis of the composition (e.g., normal to the page). Each layer includes one or more objects or pieces of data (e.g., text, lines, shapes, photographs, images, color, effects, etc.). In some embodiments, a layer is transparent where there is no object (e.g., so that an object in a lower layer is visible to a viewer). In some embodiments, other types of data (e.g., in addition to or as an alternative to visual data) are included in a layer. For example, if a software application associated with movie editing is configured to perform the techniques disclosed herein, a layer in such an embodiment may include audio (e.g., the actors speaking, background music, etc.).

In some embodiments, in order to make changes to an object or piece of data in a given layer, a user first selects that layer. Some examples of edits a user is able to perform on a selected layer include editing an existing object, adding a new object, or deleting an object. A user may also be able to (if so desired) add a new layer or delete a layer (and the objects in it).

Layers dialog box 104 includes a thumbnail of each layer and a description next to each thumbnail indicating the layer number. The current layer that is selected is highlighted in layers dialog box 104; in this figure layer, 3 is highlighted, indicating layer 3 is selected. In this example, a user can interact with layers dialog box 104 to select a layer. For example, a user may click on layer 2 in layers dialog box 104, thus changing the selected layer from layer 3 to layer 2. In some embodiments, some other interaction (e.g., right click and select from pull down menu) or input device (e.g., keyboard, stylus, etc.) is used in addition to or as an alternative to clicking on a desired layer in layers dialog box 104 to select a layer.

Using some other software applications, tool configurations remain the same as a user traverses through the layers of a composition. As used herein, a tool configuration includes the tool type (e.g., a text tool) and associated tool settings (e.g., for a text tool: font type, font size, or effects such as bold, italic, underline, etc.). For example, if the user has his tool set to a text tool with certain text settings and then selects a new layer to work on, the tool type remains the same in some other software applications. This can be annoying or inconvenient for the user because he may need to change the tool type and/or tool settings each time he selects a new layer to work on. For example, if he were working on composition 102 using this other software application and had the text tool selected (because he was working on layer 3), when he moved to layer 2 he would need to change the tool type from a text tool to a paintbrush tool. The user may also be required to change default paintbrush settings to desired settings to edit layer 2.

What is disclosed is a technique for automatically restoring tool type and associated tool settings. The last used configuration (i.e., tool type and associated tool settings for the tool type) for a particular layer are saved; the next time that layer is selected, the saved configuration is automatically restored. Using a software application that is so configured, a user would not have to re-set the tool type and/or tool settings each time he selects a different layer in a composition. For example, he would not need to perform some prescribed sequence or combination of keystrokes or make a selection from a pull down menu in order to change a tool type and/or re-set the tool setting(s) by selecting/deselecting checkboxes or entering values into boxes.

Figure 1B:
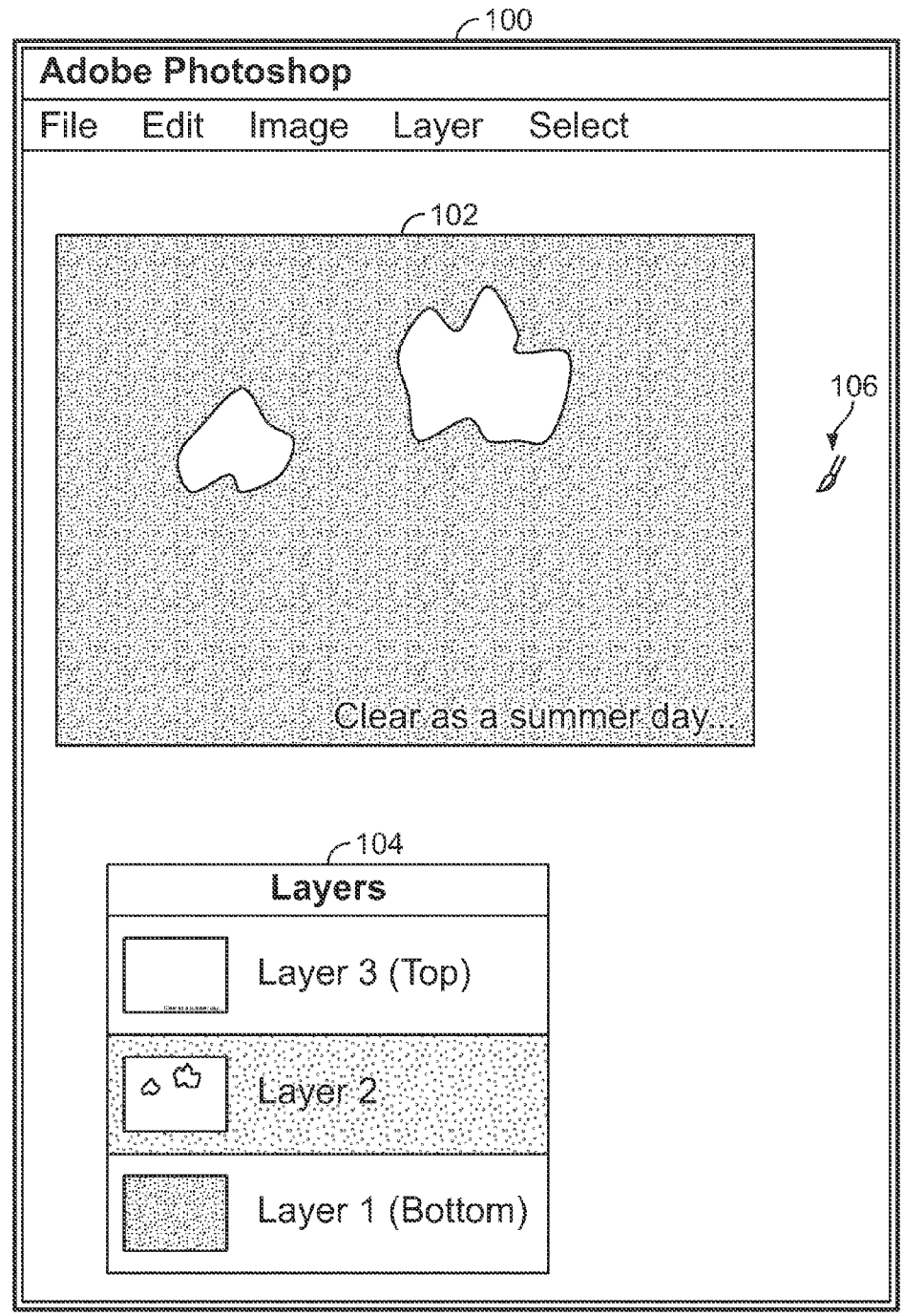
FIG. 1B is a diagram illustrating an embodiment of a session of a software application in which a middle layer of a composition is selected.

FIG. 1B is a diagram illustrating an embodiment of a session of a software application in which a middle layer of a composition is selected. In the example shown, a user has selected layer 2 and layer 2 is highlighted in layers dialog box 104.

Software application 100 is configured to remember the last tool configuration that was used when layer 2 was last selected and restores this configuration automatically. In this example, the last time the user was working on layer 2 of composition 102, he used the paintbrush tool. As a result, the tool type changes automatically to a paintbrush tool. Settings, properties, or other values associated with the paintbrush tool are also restored, such as the color being applied by the paintbrush tool. This reconfiguration is performed automatically without requiring user direction or intervention.

Cursor 106 is changed automatically. For example, if the user goes from the state shown in FIG. 1A (where layer 3 is selected) to the state shown in this figure (where layer 2 is selected) cursor 106 is automatically changed from a text type cursor to a paintbrush type cursor. If the user goes from the state shown in FIG. 1C (where layer 1 is selected), cursor 106 is automatically changed from a gradient type cursor to a paintbrush type cursor. As described above, the end result/state of automatically restoring a tool configuration does not necessarily depend upon the layer or configuration that a user is leaving. For example, in FIGS. 1A-1C when a user switches to layer 2 the tool is changed to the same tool type (i.e., paintbrush tool) and the same tool properties are applied (i.e., color=white), regardless of whether the previous selected layer was layer 1 or layer 3.

Figure 1C:
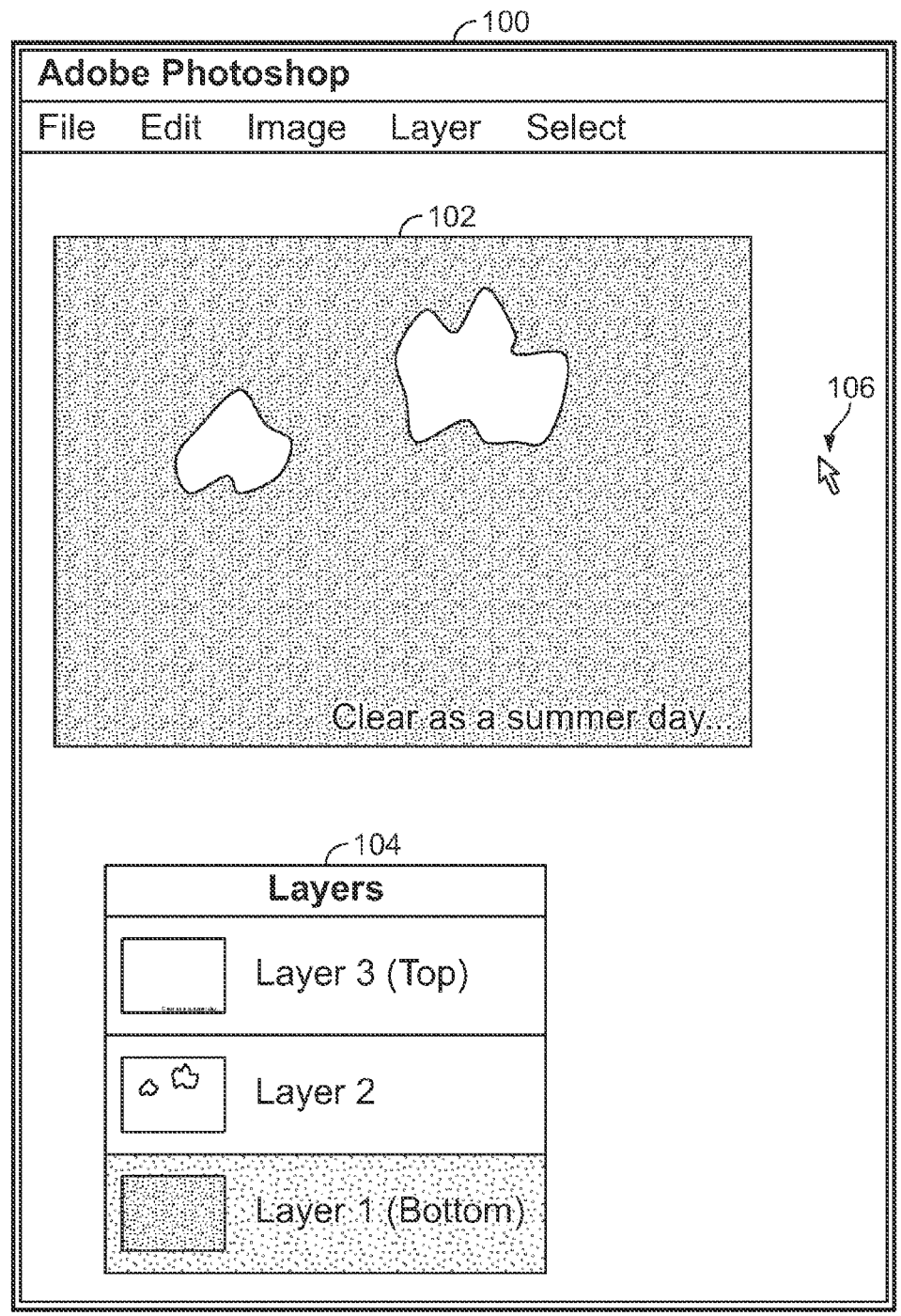
FIG. 1C is a diagram illustrating an embodiment of a session of a software application in which a bottom layer of a composition is selected.

Although in the examples shown in FIGS. 1A-1C cursor 106 is shown automatically changing even though it is not located over composition 102, in some embodiments a cursor is a selection type cursor when it not located over a composition. In some embodiments, a cursor automatically changes to a stored or remembered type when it is moved over a composition. For example, from using previous versions of a particular software application, a user may be expecting the cursor to be a selection type cursor when the cursor is not located over the composition. A user is working on layer 2 may be surprised if the cursor is a paintbrush type cursor even when the cursor is not above a composition and/or may be confused if he wants to choose a windows menu option but the cursor shows a paintbrush type of cursor.

FIG. 1C is a diagram illustrating an embodiment of a session of a software application in which a bottom layer of a composition is selected. In the example shown, a user has selected layer 3 (e.g., by clicking on the corresponding row of layers dialog box 104). The last used configuration associated with layer 1 is automatically loaded. In this case, the tool type is changed to the gradient tool and gradient tool settings are restored. Cursor 106 is changed automatically to be a gradient type cursor.

In some embodiments, a dialog box associated with an automatically restored tool is automatically presented or displayed to a user. In this figure, for example, application 100 may be configured to automatically present a gradient dialog box associated with the gradient tool (e.g., where a gradient percentage and gradient colors are set and displayed). In some embodiments, whether or not a dialog box is automatically presented depends upon whether that dialog box was open the last time that particular layer was selected. In such embodiments, if a user closes a dialog box before leaving a layer, the next time that layer is selected the dialog box is not automatically displayed.

FIG. 2 is a diagram illustrating an embodiment of a table used to store tool types and tool settings for layers of a composition. In the example shown, table 200 stores information for composition 100 shown in FIGS. 1A-1C. Although a table is shown in this figure, information may be stored or organized in any appropriate data structure.

The left column of table 200 indicates the layer for which information is stored. In this example, information is sorted in ascending order based on the layer (i.e., the top row is used to store information for layer 3 and the bottom row is used to store information for layer 1).

The middle column of table 200 is used to store the tool type last used when a particular layer was selected. In this example, the last used tool type for layers 1-3 are gradient tool, paintbrush tool, and text tool, respectively. In various embodiments, information is encoded or represented in a variety of ways. In some embodiments, unique (alpha)numeric codes are assigned to all possible tool types and these coded values are stored.

The right column is used to store the tool properties or settings for the corresponding tool type stored in the middle column. The settings for the text tool associated with layer 3 are: font=Times New Roman and font size=12 point. The paintbrush tool associated with layer 2 has settings of color=white and paintbrush type=puffy. The gradient tool associated with layer 1 has settings of color=blue and gradient=5.

Table 200 is managed and updated as appropriate. In some embodiments every time the user changes a tool or tool property/setting, table 200 is updated. Alternatively, information is updated in some embodiments when a user switches layers and the last used configuration is stored in table 200 for the layer being exited. For example, if the user goes through a number of tool changes, it may not be necessary to store all the changes except for the last one.

In some embodiments, some information in addition to that shown in this example is stored. For example, in embodiments where dialog boxes are automatically restored or presented, table 200 may be expanded to include a column to record the dialog boxes (if any) that were open the last time a particular layer was selected.

The techniques disclosed in the above examples may be used with any software application that uses layers and tools. In some embodiments, a software application associated with print publications, such as Adobe® InDesign®, is configured to perform the techniques disclosed above. In some embodiments, a software application associated with creating or developing web pages is configured to perform these techniques. Similarly, the types of tools and tool properties shown above are merely examples; other embodiments use other types of tools and/or tool properties. Some examples of other tool types include a pencil tool, a history brush tool, an art history brush tool, a dodge tool, a burn tool, a sponge tool, a blur tool, a sharpen tool, an eraser tool, a background eraser tool, a magic eraser tool, a clone stamp tool, a pattern stamp tool, a spot healing brush tool, or a healing brush tool. Some examples of tool settings include size, shape, texture, angle, or any setting corresponding to the above example tool types.

Figure 3:
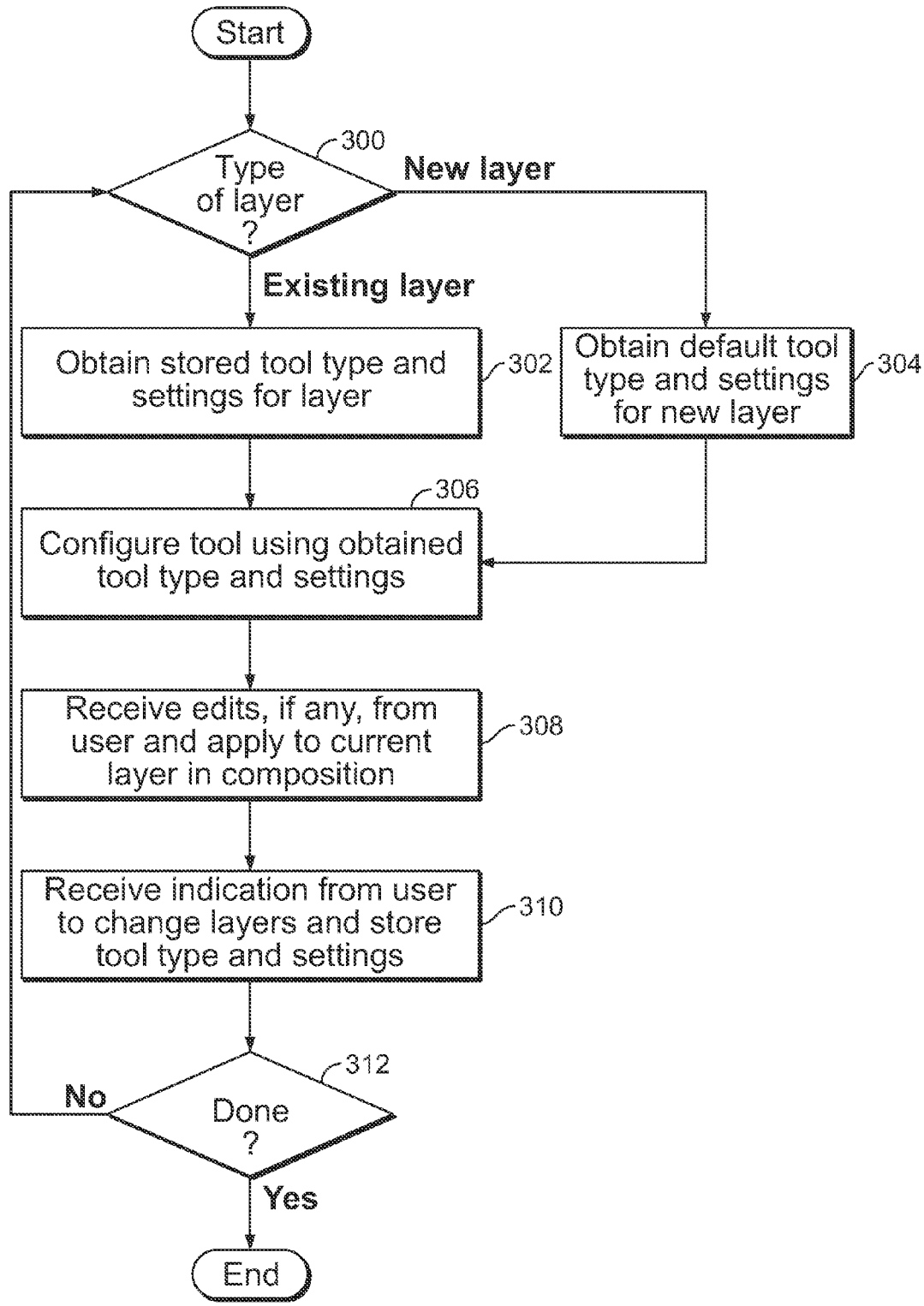
FIG. 3 is a flowchart illustrating an embodiment of a process for automatically restoring a tool configuration for layers of a composition.

FIG. 3 is a flowchart illustrating an embodiment of a process for automatically restoring a tool configuration for layers of a composition. In some embodiments, application 100 of FIGS. 1A-1C is configured to perform the example process.

At 300, the type of layer is determined. The layer in the decision at 300 is the layer being switched to (i.e., selected by a user). If it an existing layer, a stored tool type and settings for the layer are obtained at 302. For example, table 200 (or a similar data structure) may be accessed and information for that layer is retrieved. If it is a new layer, a default tool type and settings for a new layer are obtained at 304. For example, a user may create a new layer and a default configuration is obtained. In some embodiments, automatic restoration is not performed for a new layer. For example, if the user was using a certain tool with certain tool settings when he created the new layer and selected the new layer, the tool type and settings would not necessarily change.

At 306, a tool is configured using the obtained tool type and settings. In some embodiments, this includes changing the type of cursor associated with a mouse or other input device. At 308, edits, if any, are received from a user and are applied to the current layer in the composition. For example, if the composition is a digitally synthesized picture of a park, the user may add or edit clouds, trees, people, etc. to the selected layer.

An indication is received from a user to change layers, and a tool type and settings are stored at 310. In various embodiments, information is stored at 310 in a variety of ways. In some embodiments, a "dumb" process is used and information is always saved without first determining whether or not it needs to updated (e.g., because no change occurred). Alternatively, in some embodiments, stored information is accessed, is compared to the current configuration, and any out of date pieces of information are updated. Storing information at 310 is performed at a variety of times or is triggered by a variety of events. In some embodiments, information is stored every time there is a change to the tool type and/or settings. In some embodiments, information is stored when a new layer is selected and the last configuration of the old layer is saved (e.g., to minimize the number of save operations).

It is determined at 312 if the process is done. In some embodiments, a software application is only configured to remember configurations for the duration of a single session and the process ends when the software application is closed. If the process is not done, at 300 the type of the newly selected layer is determined.

In some cases, it would be desirable for a software application to have the ability to automatically restore tool configurations even if a software application is closed since the last time a given layer was selected. For example, at the end of the day, a user may close the software application and turn off his computer. It would be desirable if on the next day when the user restarted the application, the software application could automatically restore the tool types and settings from the previous day. The following figure illustrates an embodiment of a process to provide such a capability.

Figure 4:
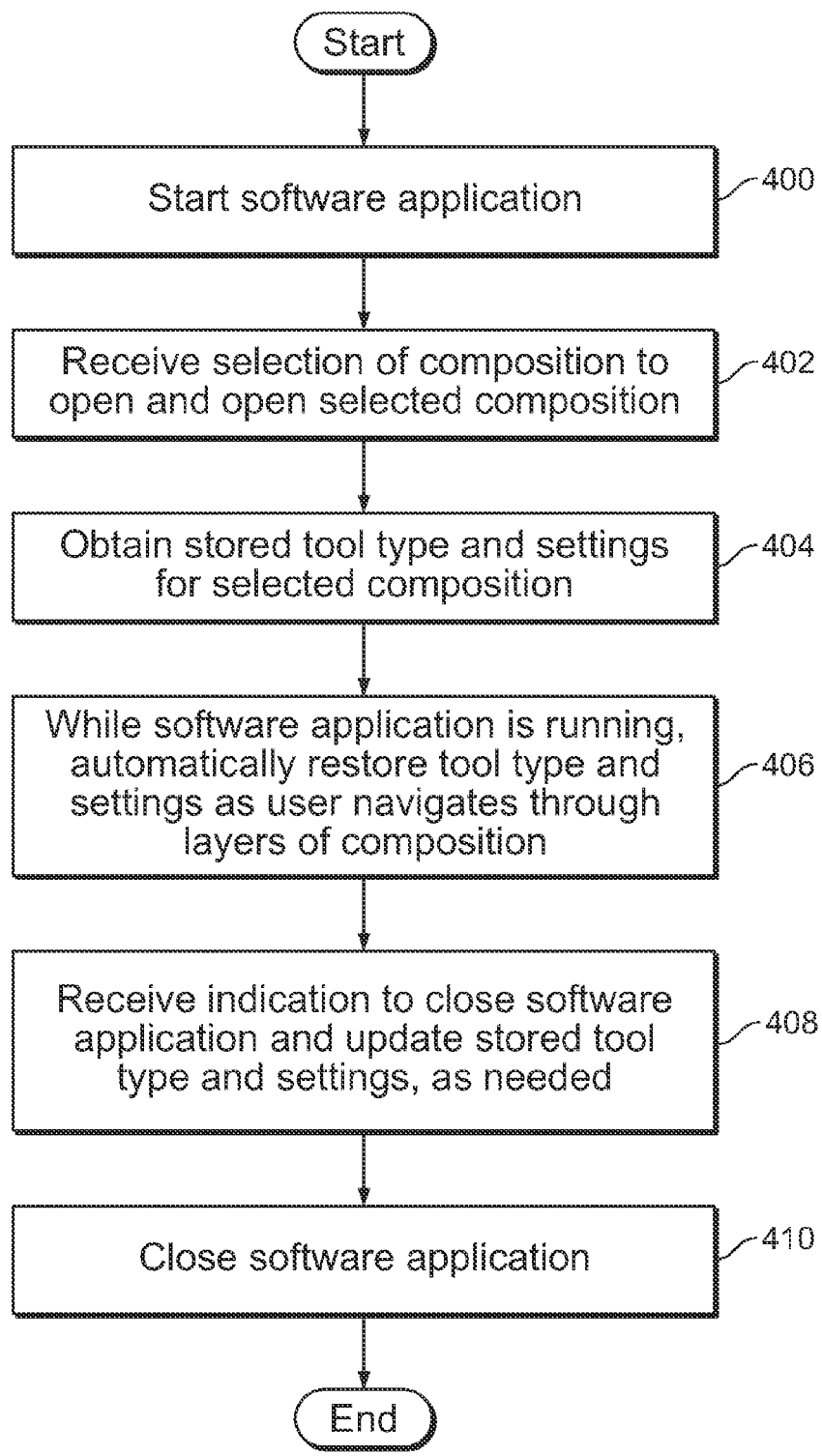
FIG. 4 is a flowchart illustrating an embodiment of a process for automatically restoring a tool configuration for a layer, even in the event a software application is closed at some point.

FIG. 4 is a flowchart illustrating an embodiment of a process for automatically restoring a tool configuration for a layer, even in the event a software application is closed at some point. In some embodiments, application 100 of FIGS. 1A-1C performs the example process. In the example shown, information associated with tool types and tool settings are stored in persistent or non-volatile memory/storage so that it can be retrieved even after the software application closes or a device on which the software application is running (e.g., a computer) is turned off. For example, table 200 or a similar data structure may be stored in persistent memory.

At 400, a software application is started. In the examples of FIGS. 1A-1C, Adobe Photoshop is started. At 402, a selection of a composition to open is received and the selected composition is opened. For example, composition 102 in FIGS. 1A-1C is selected from a list and opened.

At 404, stored tool type and settings are obtained for the selected composition. In various embodiments, stored tool types and settings are stored in a variety of locations. In some embodiments, this information is stored in persistent memory associated with or allocated to the software application (e.g., register files associated with Adobe Photoshop). In some embodiments, stored tool types and settings are stored with the composition file, for example as metadata. In some applications this is desirable, because the tool types and settings are transported with the composition if the file is moved to another device. For example, if the user puts the composition file on a USB flash drive and transfers the composition file to another device, the software application installed on the destination device will be able to automatically restore tool configurations since it has access to the proper information.

At 406, while the software application is running, tool type and settings are automatically restored as the user navigates through layers of the composition. In some embodiments, the example process of FIG. 3 is used to perform step 406. At 408, an indication to close the software application is received and stored tool type and settings are updated, as needed. In some embodiments this includes updating information stored in metadata of the composition file; in some embodiments this includes writing to persistent memory associated with the software application. At 410, the software application is closed.

Figure 5:
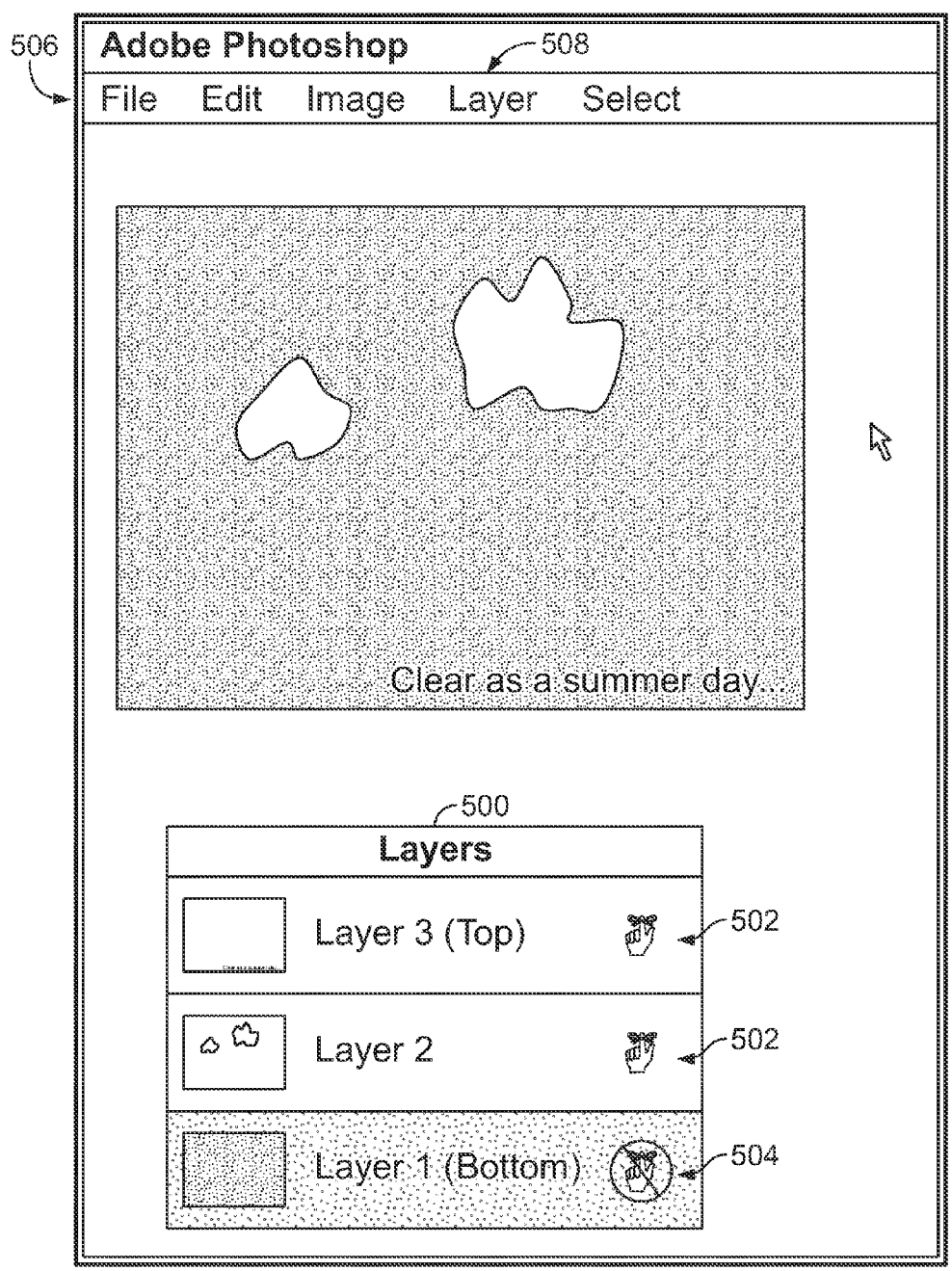
FIG. 5 is a diagram illustrating an embodiment of a software application in which automatic restoration of a tool configuration is enabled on a layer by layer basis.

FIG. 5 is a diagram illustrating an embodiment of a software application in which automatic restoration of a tool configuration is enabled on a layer by layer basis. In the example shown, layers dialog box 500 includes on each row an icon of a string tied around a finger. Each icon represents whether or not automatic restoration of a tool configuration is enabled for that particular layer or not. In this example, icons 502 in dialog box 500 show that it is enable for layers 2 and 3 and icon 504 shows that it is not enabled for layer 1.

In various embodiments, automatic restoration of a tool configuration is set or controlled in various ways. In some embodiments, a user can place a mouse pointer or other pointer above icons 500 or 502 and right click on the icon (causing a list to be displayed). The user can then select either "On" or "Off" from the list. In some embodiments, layer toolbar selection 506 in toolbar 504 is pulled down and a control panel is presented to the user. Using a checkbox or other control in the control panel, a user can turn on/off automatic restoration of tool configurations for a particular layer.

In some embodiments, the techniques disclosed above are expanded to include storing or remembering multiple configurations for a particular layer of a composition. The following figure illustrates an embodiment of a table used to store multiple configurations for layers of a composition.

FIG. 6 is a diagram illustrating an embodiment of a table configured to store the last two configurations for each layer in a composition. In the example shown, table 600 is similar to table 200 of FIG. 2 and may be stored and/or managed in a similar manner. For example, similar to table 200, table 600 can be stored (e.g., temporarily) in memory while the software application is running and/or in persistent storage, such as register files associated with the software application or as metadata in a composition file. In some embodiments, some other number of configurations (e.g., besides two configurations per layer) are stored for each layer Table 600 is configured to store a maximum of two configurations for each layer of composition 100 shown in FIGS. 1A-1C. For layer 1, the current (i.e., most recent) configuration is the gradient tool with settings of color=blue and gradient=5. For the configuration prior to that, the tool type is the same (i.e., gradient tool) but the settings are color=blue and gradient=0. For example, the user may have decided he wanted a slight gradient for layer 1 and changed the gradient from 0 to 5. Similarly, for layer 2 both the most recent configuration and the configuration before that have the tool type as the paintbrush tool with color=white, but for the former configuration the paintbrush type=puffy and for the latter configuration the paintbrush type=regular. For example, the paintbrush tool may initially default to the regular type and the user decides he wants the puffy type of paintbrush instead and changes the type of paintbrush.

Although table 600 has space for the two most recent configurations, no information is stored for the configuration prior to the current one for layer 2. For example, the configuration stored in the current configuration space may be an initial or default one and there was no prior configuration selected by the user.

The information stored in table 600 is presented to a user and/or is interacted with by a user in a variety of ways in various embodiments. In some embodiments, a user is shown a clipboard or display that shows the saved configurations for the layer that is selected. Such a display may be configured to be automatically updated as a user traverses the layers of a composition and selects different layers. In some embodiments, a clipboard or display is configured to receive a user selection of a saved configuration. For example, a user may double click on a particular configuration (e.g., presented or represented in a display) and that configuration is restored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, executed by a processor, comprising:
receiving a user selection of a first tool type and setting(s) for editing a first layer of a plurality of layers of a composition;
while the first layer is active with the first tool type and setting(s), receiving a user selection of a second layer selected from the plurality of layers of a composition, wherein the second layer is different from the first layer;
storing in memory the first tool type and setting(s) as being the last active tool type and setting(s) in the first layer and making the second layer active, wherein the first tool type and setting(s) are different from the default tool type and setting(s) in the first layer;
receiving a selection of a third layer from a plurality of layers of a composition, wherein the third layer is different from the second layer;
making the third layer active and determining whether the third layer is an existing layer or a new layer;
in the event it is determined that the third layer is a new layer, obtaining a default tool type and one or more tool setting(s) for the third layer;
in the event it is determined that the third layer is an existing layer and not a new layer, automatically identifying which tool type and tool setting(s) were in use in the third layer a last time the third layer was selected and obtaining the identified tool type and tool setting(s), and if it is determined that the third layer is the first layer, identifying the first tool type and tool setting(s) as being in use in the first layer the last time the first layer was selected; and
automatically configuring a tool for the third layer using the obtained tool type and tool setting(s), wherein the tool is associated with manipulating the composition and the tool types and setting(s) of the first, second, and third layers are stored as metadata in an independently transferrable composition file.

2. A method as recited in claim 1, wherein the tool is associated with an image editing application.

3. A method as recited in claim 1, wherein the tool is associated with a web page development application.

4. A method as recited in claim 1, wherein obtaining the identified tool type and tool setting(s) includes obtaining from persistent storage.

5. A method as recited in claim 4, wherein the persistent storage includes metadata associated with a file.

6. A method as recited in claim 1 further comprising:
receiving, while the first layer is selected, at least one change to the tool type and/or tool setting(s); and
storing information associated with the change.

7. A method as recited in claim 6, wherein storing is triggered when the second layer in the plurality of layers is selected.

8. A method as recited in claim 6, wherein storing is triggered when the change to the tool type and/or tool setting(s) is received.

9. A method as recited in claim 1, wherein automatically configuring the tool is enabled on a layer by layer basis for the plurality of layers.

10. A method as recited in claim 1, wherein: the tool type is associated with a cursor that visually indicates which tool is active and wherein automatically configuring includes updating the cursor to visually indicate the obtained tool type.

11. A computer program product, the computer program product being embodied in a non-transitory computer readable medium and comprising computer instructions for:

receiving a user selection of a first tool type and setting(s) for editing a first layer of a plurality of layers of a composition;

while the first layer is active with the first tool type and setting(s), receiving a user selection of a second layer selected from the plurality of layers of a composition, wherein the second layer is different from the first layer;

storing in memory the first tool type and setting(s) as being the last active tool type and setting(s) in the first layer and making the second layer active, wherein the first tool type and setting(s) are different from the default tool type and setting(s) in the first layer;

receiving a selection of a third layer from a plurality of layers of a composition, wherein the third layer is different from the second layer;

making the third layer active and determining whether the third layer is an existing layer or a new layer;

in the event it is determined that the third layer is a new layer, obtaining a default tool type and one or more tool setting(s) for the third layer;

in the event it is determined that the third layer is an existing layer and not a new layer, automatically identifying which tool type and tool setting(s) were in use in the third layer a last time the third layer was selected and obtaining the identified tool type and tool setting(s), and if it is determined that the third layer is the first layer, identifying the first tool type and tool setting(s) as being in use in the first layer the last time the first layer was selected; and automatically configuring a tool for the third layer using the obtained tool type and tool setting(s), wherein the tool is associated with manipulating the composition and the tool types and setting(s) of the first, second, and third layers are stored as metadata in an independently transferrable composition file.

12. A computer program product as recited in claim 11, wherein between (1) the last time the first layer was selected and (2) the selection of the third layer, the computer program product was closed.

13. A computer program product as recited in claim 12, wherein the computer instructions for obtaining the identified tool type and tool setting(s) include computer instructions for obtaining from persistent storage.

14. A computer program product as recited in claim 13, wherein the persistent storage includes register files associated with the computer program product.

15. A system, comprising:
a processor; and
a memory coupled with the processor, wherein the memory is configured to provide the processor with instructions which when executed cause the processor to:
receive a user selection of a first tool type and setting(s) for editing a first layer of a plurality of layers of a composition;
while the first layer is active with the first tool type and setting(s), receive a user selection of a second layer selected from the plurality of layers of a composition, wherein the second layer is different from the first layer;
store in memory the first tool type and setting(s) as being the last active tool type and setting(s) in the first layer and make the second layer active, wherein the first tool type and setting(s) are different from the default tool type and setting(s) in the first layer;
receive a selection of a third layer from a plurality of layers of a composition, wherein the third layer is different from the second layer;
make the third layer active and determining whether the third layer is an existing layer or a new layer;
in the event it is determined that the third layer is a new layer, obtain a default tool type and one or more tool setting(s) for the third layer;
in the event it is determined that the third layer is an existing layer and not a new layer, automatically identify which tool type and tool setting(s) were in use in the third layer a last time the third layer was selected and obtain the identified tool type and tool setting(s), and if it is determined that the third layer is the first layer, identify the first tool type and tool setting(s) as being in use in the first layer the last time the first layer was selected; and
automatically configure a tool for the third layer using the obtained tool type and tool setting(s), wherein the tool is associated with manipulating the composition and the tool types and setting(s) of the first, second, and third layers are stored as metadata in an independently transferrable composition file.

16. A system as recited in claim 15, wherein the instructions for obtaining the tool type and tool setting(s) include instructions for obtaining from persistent storage.

17. A system as recited in claim 15, wherein automatically configuring the tool is enabled on a layer by layer basis for the plurality of layers.

* * * * *